United States Patent [19]

Tanigaki et al.

[11] 4,086,389
[45] Apr. 25, 1978

[54] COATING COMPOSITION COMPRISING CRYSTALLINE CELLULOSE AND A COATED ELECTRODE FOR ARC WELDING PRODUCED THEREWITH

[75] Inventors: Takashi Tanigaki; Takeshi Koshio, both of Yokohama; Yoshikazu Tanaka, Sagamihara, all of Japan

[73] Assignee: Nippon Steel Corporation, Tokyo, Japan

[21] Appl. No.: 676,403

[22] Filed: Apr. 13, 1976

[30] Foreign Application Priority Data

Apr. 23, 1975 Japan .................................. 50/48645
Apr. 5, 1976 Japan .................................. 51/37946

[51] Int. Cl.$^2$ .................... B05D 5/12; B23K 35/365; H05B 7/07
[52] U.S. Cl. .................... 428/385; 427/59; 427/61; 428/387
[58] Field of Search .................... 427/59, 61; 428/385, 428/387; 219/146

[56] References Cited

U.S. PATENT DOCUMENTS

| | | | |
|---|---|---|---|
| Re. 28,326 | 2/1975 | Zvanut | 219/146 |
| 1,643,274 | 9/1927 | Langstroth et al. | 428/387 |
| 1,754,063 | 4/1930 | Stresau | 428/387 |
| 1,884,715 | 10/1932 | Jerabek | 428/387 |
| 1,930,649 | 10/1933 | Langstroth et al. | 428/387 |
| 2,031,494 | 2/1936 | Lemmerman | 428/387 |
| 2,051,775 | 8/1936 | Pennington | 428/387 |
| 2,062,457 | 12/1936 | Johnston | 428/387 |
| 2,436,867 | 3/1948 | Lee | 428/387 |
| 2,785,094 | 3/1957 | Garriott | 428/387 |
| 3,118,760 | 1/1964 | Avery et al. | 428/385 |
| 3,471,310 | 10/1969 | Joseph et al. | 428/385 |
| 3,554,792 | 1/1971 | Johnson | 428/387 |

FOREIGN PATENT DOCUMENTS

| | | | |
|---|---|---|---|
| 180,117 | 12/1935 | Switzerland | 427/59 |
| 300,093 | 9/1954 | Switzerland | 428/385 |
| 730,137 | 5/1955 | United Kingdom | 428/387 |

*Primary Examiner*—J.C. Cannon
*Attorney, Agent, or Firm*—Toren, McGeady and Stanger

[57] ABSTRACT

A coating composition for a coated electrode for arc welding comprising 3 to 30% of fibrous mineral, 2 to 12% of crystalline cellulose, with the balance being at least one of a slag forming agent, an arc stabilizing agent, a deoxidizing agent and an alloying agent.

2 Claims, No Drawings

COATING COMPOSITION COMPRISING CRYSTALLINE CELLULOSE AND A COATED ELECTRODE FOR ARC WELDING PRODUCED THEREWITH

BACKGROUND OF THE INVENTION

1. Field of the Invention

The present invention relates to a coating compositon for a coated electrode for arc welding, and a coated electrode covered with the composition.

2. Description of the Prior Art

Conventionally coating compositions containing a considerable amount of starch and dextrin, for example, a high-cellulose coating composition, have been widely used for coating electrodes for arc welding. These coated electrodes, however, have been confronted with defects that when the welding is done with a high current density (220A for a vertical downward welding with an electrode of 4.0 mm diameter) the coating on the electrode is excessively heated due to the Joule effect caused in the core wire so that organic compounds contained in the coating composition denatures or decomposes to cause a remarkable phenomenon of electrode burning, resulting in occurrence of pits and blow holes in the deposited metal, and failing to exert various functions expected from the coating composition. Further, the adhesion force of the coating is weakened so that cracking occurs more often in the cup of coating formed at the tip of the electrode during the welding and the coating easily chips off to cause unstability of the arc and short-circuiting of the electrode, resulting in remarkable difficulty in the welding operation.

Meanwhile, in recent years various high-tensile strength steel pipes having a tensile strength more than 50 kg/mm$^2$ and thick-walled mild steel pipes have been increasingly used for building oil and gas pipe lines in cold regions, and joints of these steel pipes are required to have enough strength and toughness to meet severe service conditions in these applications. Conventional electrodes have been found unsuccessful in providing such weld joints.

SUMMARY OF THE INVENTION

The object of the present invention is to provide a coating composition and a coated electrode which eliminates the above defects confronted with by the conventional art and meet the requirements of the weld joints.

The coating composition according to the present invention comprises 3 to 30% of fibrous mineral, 2 to 12% of crystalline cellulose with the balance being a slag forming agent, an arc stabilizing agent and a deoxidizing agent, and may further contains one of Ni, Cr and Mo in an amount not more than 30% for Ni, not more than 10% for each of Cr and Mo, and not more than 30% for the total of Ni, Cr and Mo.

DETAILED DESCRIPTION OF THE INVENTION

The fibrous mineral used in the present invention means a fibrous substance with its main components being $SiO_2$ and MgO, and includes cation fibers and asbestos, for example.

The crystalline cellulose admixed with the fibrous mineral in the present invention is also called as "micro crystalline cellulose" in Europe and America, and means highpurity crystalline cellulose fine powder obtained by hydrolating a common cellulose in a mineral acid, washing and removing the amorphous region, grinding, refining and drying.

In the present invention, addition of only one of the fibrous mineral and the crystalline cellulose fails to produce desired results, and only when these components are added together the desired results are obtained.

Further explanations will be set forth below in this point.

Experiments were done to evaluate resistance against the electrode burning, condition of the coating cup and welding efficiency using various electrodes with different coatings and the results are shown in Table 1.

The mixture A in Table 1 was prepared by admixing 12.8% rutile, 17.1% illuminite, 8.5% Fe-Mn (JIS G2301 No. 2), 11.1% talc, 17.1% feldspar, 5.1% starch, 13.7% cellulose, 12.0% Ni, 0.9% Cr and 1.7% Mo, and the cation fibers and asbestos were used as the fibrous mineral. Mild steel core wires of 4.0 mm diameter and 400 mm length were coated with the coating compositions with addition of water glass to prepare the electrodes No. 1 to No. 21, and welding was done on a mild steel plate of 20 mm thickness, 200 mm width and 400 mm length with a groove angle of 60° and a groove depth of 17 mm by a vertical downward method.

As clearly understood from the results shown in Table 1, the results obtained by the electrodes No. 1 to No. 3 containing no fibrous mineral and by the electrodes No. 4 to No. 7 containing less than 3% fibrous mineral all showed remarkable electrode burning, cracking in the coating cup and the short-circuiting of the electrode.

Based on the above results, the lower limit of the fibrous mineral has been defined at 3% in the present invention.

The electrode No. 18 containing 32% fibrous mineral and 5% crystalline cellulose showed the result that although no electrode burning was caused and the coating cup was sound, the slag removability was worsened, the spatter increased, and the bead shape was bad.

On the basis of the above results, the upper limit of the fibrous mineral has been defined at 30% in the present invention.

Meanwhile, in case of the electrodes No. 11 and No. 15 containing less than 2% of crystalline cellulose, No. 10, No. 14 and No. 17 containing more than 12% of crystalline cellulose, the results were that, although no electrode burning appeared, the coating cup cracked, the coating chipped off, and the shortcircuiting during the welding.

The range from 2 to 12% for the crystalline cellulose content in the coating composition according to the present invention has been defined from the reason that with less than 2% of crystalline cellulose, the coating cup cracks due to the heating to which the coating is subjected, and the coating easily chips off to cause difficulty in the welding, and on the other hand, with more than 12% of crystalline cellulose, fine longitudinal and traverse crackings are caused in the coating to cause chips-off of the coating.

The fact that the coating cup does not crack and remains sound without burning in spite of a high current density welding, when the fibrous mineral and the crystalline cellulose are added in the above defined range may be attributed to assumption that the fibrous powder of the fibrous mineral and the high-purity crystalline cellulose are dispersed among particles of the other components and combine with the water glass to further enhance the binding force. This is considered to contribute for improvement of heat resistance of the coating in cooperation of the inherent heat resistance of the fibrous mineral. In this case, when the crystalline cellulose is substituted by starch, dextrin or common cellulose it is impossible to prevent the cracking of the coating cup, and thus the addition of the crystalline cellulose is essential in the present invention.

Further, in the present invention, Ni, Cr and Mo may be optionally added in the coating composition for the purpose of improving the tensile strength and the toughness at low temperature. Particularly, Ni improves remarkably the toughness at low temperatures.

Thus, when Ni is contained in the weld metal in the range from 1.0 to 4%, a satisfactory toughness is maintained at low temperatures as from $-20°$ to $-60°$ C, and also the tensile strength of the weld metal improves about 3 to 5 $kg/mm^2$ higher than that obtained without the Ni content. However, when the Ni content in the weld metal exceeds 6% resistance of the weld metal to cracking rather deteriorates.

When Ni is added to the coating composition in an amount of 13%, about 2.5% Ni is contained in the weld metal, and when 30% Ni is added to the coating composition about 6% Ni content in the weld metal is maintained.

Addition of either Cr or Mo in a very small amount is effective to increase the strength of the weld metal. For example, 0.5% Cr or 0.5% Mo is contained in the weld metal, the strength improves about 10 $kg/mm^2$ higher than that obtained without these elements. When Cr and Mo are added in single to the coating composition in an amount of 5%, 0.5% Cr and 0.8% Mo are contained in the weld metal.

All of Ni, Cr and Mo are effective to enhance the strength of the weld metal, but excessive addition of these elements causes deterioration of the cracking resistance of the weld metal with only economical disadvantage. Therefore, in welding steel pipes as of API 5LX-X70 to X75, not more than 6% of Ni and not more than 1% of each of Cr and Mo in the weld metal are enough for obtaining tensile strength of 56 $kg/mm^2$ or higher and good toughness (for example, 3.3 kg-m or higher Charpy impact value) at low temperatures from $-20°$ to $-60°$ C, and thus addition at least one of Ni, Cr and Mo in an amount not more than 30% is enough for the purpose.

Ni, Cr and Mo may be added in the alloy form, such as Fe-Ni, Fe-Cr and Fe-Mo.

The coating composition for an electrode according to the present invention further contains a slag forming agent, such as $SiO_2$ and $Fe_2O_3$, an arc stabilizing agent, such as $CaCO_3$ and iron powder, and a deoxidizing agent such as Fe-Ti.

The coating composition according to the present invention is admixed with a binding agent, such as water glass, coated on a core wire, such as a mild steel by a conventional method and dried to obtain a coated electrode.

The present invention will be more clearly understood from the following examples.

Table 2 shows various coating compositions within and out of the scope of the present invention and results of experiments made for evaluation of the welding usability of the electrodes, such as the resistance against electrode burning, the condition of a coating cup, the slag removability, the mechanical property and the cracking resistance of the weld metals.

For conducting the above experiments, the coating compositions shown in Table 2 were admixed with water glass and coated on a mild steel core wire by a conventional method to obtain coated electrodes and for evaluation of the welding usuability, the mechanical properties of the deposited metals were investigated according to AWS A5.1 (American Welding Society) and a vertical downward welding was done at a high current density of 190 Amp. at the butt joint between API5LX-X70 steel pipes of 18.3 mm wall thickness, and 1219 mm outer diameter with 30° groove on one side. For evaluation of the cracking resistance, the method of Fisco cracking test according to JIS Z3155 was performed and those showing a cracking ratio not more than 25% with 1 mm gap was evaluated as good (o) and those showing a high cracking ratio were evaluated as bad (x).

The coating compositions shown in Table 2 were used as the coating composition for AWS E8010G electrode.

In Table 2, A-1 - A-5 are comparative examples, and A-1 does not contain the fibrous mineral and A-2 does not contain the crystalline cellulose. B-2 - B-17 contain the fibrous mineral and the crystalline cellulose within the scope of the present invention and showed good resistance against the electrode burning, no coating cup cracking and no chip-off of the coating during without short-circuiting, pits and blow holes, and also showed excellent slag removability. However, B-1 which does not contain any of Ni, Cr and Mo shows unsatisfactory notch toughness, B-2, B-4 and B-10 which contain Ni beyond 30%, B-3 which contains Cr and Mo more than 10% each, and B-5 which contains Cr beyond 10%, do not show satisfactory cracking resistance, particularly, B-3 and B-5 which contain no Ni but contain Mo excessively show poor toughness. Whereas, B-6 to B-17, due to the total addition of Ni, Cr, Mo not more than 30%, or due to the addition of Cr and Mo not more than 10% each, show a Charpy impact value of not lower than 3.3 kg-m at $-40°$ C, and good cracking resistance, and fully satisfy the mechanical properties required by AWS E8010G. Particularly, B-6, B-8, B-10 - B-12, which give 2.5% or higher Ni content in the deposited metal, assure excellent notch toughness, and B-13 to B-17 which contain no Ni can avoid deterioration of notch toughness due to their proper content of Cr and Mo.

Similar experiments as above were performed applying the coating composition of the present invention to other coating types than the above, and good results were obtained similarly in respect of the welding usability of the electrodes, and the mechanical properties and the cracking resistance of the weld metal.

As described above, as the coated electrodes according to the present invention improves remarkably the resistance against electrode burning at a higher welding current density as compared with the conventional electrodes, no defect such as pits and blow holes is eliminated, and the binding force of the coating cup is enhanced remarkably and thus soundness of the coating cup is assured. Moreover, the welding efficiency is remarkably improved. The present invention can be advantageously applied to a vertical downward welding of a thick mild steel plate and a high-grade high tensile strength steel pipe having a tensile strength of 50 $kg/mm^2$ or higher because the present invention can provide excellent strength, toughness and cracking resistance of the weld metal.

Table 1

| Electrode No. | Coating Compositions (%) Fibrous Mineral | Coating Compositions (%) Crystalline Cellulose | Coating Compositions (%) Mixture A | Electrode Burning Registance | Condition of Coating Cup | Other Welding Useability |
| --- | --- | --- | --- | --- | --- | --- |
| 1 | 0 | 0 | 100 | x | x | o |
| 2 | 0 | 8 | 92 | x | x | o |
| 3 | 0 | 17 | 83 | x | x | x |
| 4 | 2 | 2 | 96 | x | x | o |
| 5 | 2 | 7 | 91 | x | x | o |
| 6 | 2* | 7 | 91 | x | x | o |
| 7 | 2 | 14 | 84 | x | x | x |
| 8 | 4 | 4 | 92 | o | o | o |
| 9 | 4 | 10 | 86 | o | o | o |
| 10 | 4 | 15 | 81 | o | x | x |
| 11 | 16 | 1 | 83 | o | x | o |
| 12 | 16 | 9 | 75 | o | o | o |
| 13 | 16* | 9 | 71 | o | o | o |
| 14 | 16 | 13 | 71 | o | x | o |
| 15 | 28 | 0 | 72 | o | x | o |
| 16 | 28 | 6 | 66 | o | o | o |
| 17 | 28 | 16 | 56 | o | x | o |
| 18 | 32 | 5 | 63 | o | o | x |
| 19 | 32 | 11 | 57 | o | o | x |
| 20 | 32 | 18 | 50 | o | x | x |
| 21 | 32* | 18 | 50 | o | x | x |

Standards of Evaluation:
- Electrode Burning Registance — o: good without burning, x: burning occurs
- Condition of Coating Cup — o: sound without cracking, x: cracking occurs
- Other Welding Useability — o: good, x: poor slag removability and unsatisfactory bead shape

*Asbesto was used

Table 2 (1)

| | | Comparative A-1 | Comparative A-2 | Comparative A-3 | Comparative A-4 | Comparative A-5 | Present Invention B-1 | Present Invention B-2 | Present Invention B-3 | Present Invention B-4 | Present Invention B-5 | Present Invention B-6 | Present Invention B-7 | Present Invention B-8 | Present Invention B-9 |
| --- | --- | --- | --- | --- | --- | --- | --- | --- | --- | --- | --- | --- | --- | --- | --- |
| Coating Composition (%) | Cation Fiber | — | 12 | — | — | — | 12 | 3 | 5 | 4 | 16 | 5 | 20 | — | — |
| | Asbesto | — | — | 2 | 14 | 2 | — | — | — | — | — | — | — | — | — |
| | Crystalline Cellulose | 8 | — | 3 | 1 | 2 | 4 | 2 | 3 | 2 | 10 | 4 | — | 5 | 8 |
| | | | | | | | | | | | | | 8 | 4 | 5 |
| | Rutile | 18 | 18 | 16 | 16 | 15 | 18 | 16 | 16 | 15 | 16 | 16 | 16 | 16 | 16 |
| | Hematite | 7 | 7 | 6 | 6 | 5 | 7 | 6 | 6 | 5 | 6 | 6 | 6 | 6 | 6 |
| | Cellulose | 22 | 22 | 20 | 20 | 20 | 22 | 20 | 20 | 20 | 20 | 20 | 20 | 20 | 20 |
| | FeMn | 8 | 8 | 7 | 7 | 7 | 8 | 7 | 7 | 7 | 7 | 7 | 7 | 7 | 7 |
| | Calcium Carbonate | 7 | 7 | 6 | 6 | 6 | 7 | 6 | 6 | 6 | 6 | 6 | 6 | 6 | 6 |
| | Dextrin | 4 | 4 | 3 | 3 | 3 | 4 | 3 | 3 | 3 | 3 | 3 | 3 | 3 | 3 |
| | Silica Sand | 3 | 3 | 2 | 2 | 2 | 3 | 2 | 2 | 2 | 2 | 2 | 2 | 2 | 2 |
| | Ni | 8 | 3 | 32 | — | 24 | — | 22 | — | 24 | — | 30 | 7 | 22 | 2 |
| | Cr | 1 | — | — | — | — | — | 7 | 12 | — | 12 | — | — | 8 | 3 |
| | Fe-Cr (11) | — | 2 (1.3) | — | — | 12 (7.6) | — | — | — | — | — | — | — | — | 2 (5.2) |
| | Fe-Mo (12) | 1 (0.7) | 1 (0.7) | — | 19 (12.4) | — | — | 5 (3.3) | 17 (11.1) | 12 (7.8) | — | — | — | — | — |
| | Iron Powder | 13 | 13 | 3 | 6 | 2 | 15 | 1 | 3 | — | 2 | 1 | 5 | 1 | 16 |
| | Total | 100 | 100 | 100 | 100 | 100 | 100 | 100 | 100 | 100 | 100 | 100 | 100 | 100 | 100 |

Table 2 (2)

| | | Present Invention B-10 | Present Invention B-11 | Present Invention B-12 | Present Invention B-13 | Present Invention B-14 | Present Invention B-15 | Present Invention B-16 | Present Invention B-17 |
| --- | --- | --- | --- | --- | --- | --- | --- | --- | --- |
| Coating Compositions (%) | Cation Fiber | 3 | 5 | 8 | 18 | 14 | 15 | — | — |
| | Asbesto | — | — | — | — | — | — | 15 | 20 |
| | Crystalline Cellulose | 3 | 4 | 10 | 8 | 6 | 2 | 7 | 12 |
| | Rutile | 16 | 16 | 16 | 16 | 16 | 16 | 16 | 16 |
| | Hematite | 6 | 6 | 6 | 6 | 6 | 6 | 6 | 6 |
| | Cellulose | 20 | 20 | 20 | 20 | 20 | 20 | 20 | 20 |
| | FeMn | 7 | 7 | 7 | 7 | 7 | 7 | 7 | 7 |
| | Calcium Carbonate | 6 | 6 | 6 | 6 | 6 | 6 | 6 | 6 |
| | Dextrin | 3 | 3 | 3 | 3 | 3 | 3 | 3 | 3 |
| | Silica Sand | 2 | 2 | 2 | 2 | 2 | 2 | 2 | 2 |
| | Ni | 23 | 20 | 15 | — | — | — | — | — |
| | Cr | — | 3 | — | — | 8 | 5 | — | — |
| | Fe-Cr (11) | — | — | 4 | 14 | — | — | — | — |
| | Fe-Mo (12) | 10 (6.5) | 8 (5.2) | 2 (1.3) | — | 12 (7.8) | 5 (3.2) | 14 (9.1) | 6 (3.9) |
| | Iron Powder | 1 | — | 1 | — | — | 13 | 4 | 2 |
| | Total | 100 | 100 | 100 | 100 | 100 | 100 | 100 | 100 |

Table 2 (3)

| | Comparative A-1 | Comparative A-2 | Comparative A-3 | Comparative A-4 | Comparative A-5 | Present Invention B-1 | Present Invention B-2 | Present Invention B-3 | Present Invention B-4 | Present Invention B-5 | Present Invention B-6 | Present Invention B-7 | Present Invention B-8 | Present Invention B-9 |
| --- | --- | --- | --- | --- | --- | --- | --- | --- | --- | --- | --- | --- | --- | --- |

Table 2 (1)-continued

| Composition of Weld Metal % | | | | | | | | | | | | | | |
|---|---|---|---|---|---|---|---|---|---|---|---|---|---|---|
| Ni | 1.5 | 0.6 | 6.3 | <0.1 | 4.9 | <0.1 | 4.5 | <0.1 | 4.9 | <0.1 | 5.8 | 1.3 | 4.5 | 0.5 |
| Cr | 0.1 | 0.1 | <0.1 | <0.1 | 0.7 | <0.1 | 0.6 | 1.0 | <0.1 | 0.9 | <0.1 | <0.1 | 0.8 | 0.5 |
| Mo | 0.1 | 0.1 | <0.1 | 1.8 | <0.1 | <0.1 | 0.5 | 1.6 | 1.2 | <0.1 | <0.1 | <0.1 | <0.1 | <0.1 |

| Test Results | | | | | | | | | | | | | | | |
|---|---|---|---|---|---|---|---|---|---|---|---|---|---|---|---|
| Electrode Burning Resistance | x | o | o | o | o | o | o | o | o | o | o | o | o | o |
| Condition of Coating Cup | x | x | o | o | o | o | o | o | o | o | o | o | o | o |
| Tensile Strength kg/mm² | 58 | 57 | 57 | 80 | 65 | 46 | 84 | 87 | 75 | 64 | 56 | 54 | 67 | 56 |
| Charpy Impact Value at −40° C kg-m | 3.9 | 3.5 | 10.4 | 2.1 | 5.8 | 1.1 | 5.2 | 1.6 | 6.9 | 2.0 | 10.2 | 3.5 | 7.5 | 4.0 |
| Cracking Resistance | o | o | x | x | x | o | x | x | x | x | o | o | o | o |

Table 2 (4)

| | | Present Invention | | | | | | | |
|---|---|---|---|---|---|---|---|---|---|
| | | B-10 | B-11 | B-12 | B-13 | B-14 | B-15 | B-16 | B-17 |
| Composition of Weld Metal (%) | Ni | 4.7 | 4.1 | 2.9 | <0.1 | <0.1 | <0.1 | <0.1 | <0.1 |
| | Cr | <0.1 | 0.3 | 0.3 | 0.8 | 0.7 | 0.5 | <0.1 | <0.1 |
| | Mo | 1.0 | 0.8 | 0.2 | <0.1 | 1.2 | 0.5 | 1.4 | 0.6 |
| Test Results | Electrode Burning Resistance | o | o | o | o | o | o | o | o |
| | Condition of Coating Cup | o | o | o | o | o | o | o | o |
| | Tensile Strength Kg/mm² | 65 | 72 | 59 | 62 | 84 | 68 | 74 | 58 |
| | Charpy Impact Value at −40° C kg-m | 7.6 | 6.7 | 7.0 | 3.5 | 3.8 | 3.9 | 3.6 | 3.5 |
| | Cracking Resistance | o | o | o | o | o | o | o | o |

Remarks:
(1) Fe-Cr containing 63% Cr was used. The values in brackets represent conversion into Cr content.
(2) Fe-Mo containing 65% Mo was used. The values in brackets represent conversion into Mo content.
(3) "—" means no addition.
(4) "o" means good and "x" means bad.

What is claimed is:

1. A coated electrode for arc welding comprising a steel core wire and a coating on said steel core, said coating comprising 3 to 30% of fibrous mineral, 2 to 12% of crystalline cellulose, with the balance being at least one of a slag forming agent, an arc stabilizing agent, a deoxidizing agent and an alloying agent.

2. A coated electrode according to claim 1, in which the coating further comprises at least one of Ni, Cr and Mo in an amount not more than 30% for Ni, not more than 10% for each of Cr and Mo and in an amount not more than 30% for the total of Ni, Cr and Mo.

* * * * *